United States Patent

Suzuki et al.

[11] Patent Number: 5,563,003
[45] Date of Patent: Oct. 8, 1996

[54] FUEL CELL AND SUPPLEMENTARY ELECTROLYTE CONTAINER AND METHOD FOR SUPPLEMENTING FUEL CELL WITH ELECTROLYTE

[75] Inventors: Hiroaki Suzuki, Hitachi; Keizou Ohtsuka, Katsuta; Toshiki Kahara, Ibaraki-ken; Tadashi Yoshida, Hitachi, all of Japan

[73] Assignee: Hitachi, Ltd., Tokyo, Japan

[21] Appl. No.: 214,758

[22] Filed: Mar. 18, 1994

[51] Int. Cl.$^6$ ............ H01M 8/04; H01M 8/14; H01M 2/14; H01M 2/02
[52] U.S. Cl. ............ 429/14; 429/16; 429/34; 429/38; 429/112
[58] Field of Search ............ 429/14, 16, 34, 429/38, 112, 116, 113

[56] References Cited

U.S. PATENT DOCUMENTS

| | | |
|---|---|---|
| 3,304,202 | 2/1967 | Ahmad . |
| 4,185,145 | 1/1980 | Breault ...................... 429/34 |
| 4,732,822 | 3/1988 | Wright et al. ............... 429/14 |
| 4,761,348 | 8/1988 | Kunz et al. ................. 429/14 |
| 4,898,793 | 2/1990 | Matsumura et al. . |
| 4,902,587 | 2/1990 | Saitch et al. ............... 429/16 |

FOREIGN PATENT DOCUMENTS

| | | |
|---|---|---|
| 58-155668 | 9/1983 | Japan . |
| 59-217959 | 12/1984 | Japan . |
| 61-277169 | 12/1986 | Japan . |
| 63-58768 | 3/1988 | Japan . |
| 1-89150 | 4/1989 | Japan . |
| 1-211861 | 8/1989 | Japan . |
| 60-208058 | 11/1995 | Japan . |

Primary Examiner—Richard L. Schilling
Attorney, Agent, or Firm—Fay, Sharpe, Beall, Fagan, Minnich & McKee

[57] ABSTRACT

Molten carbonate type or phosphoric acid type fuel cells and a method for supplementing these fuel cells with an electrolyte are disclosed. A fuel cell having an extended life is provided by scattering a plurality of sealed supplementary electrolyte containers made of a material which is soluble in the electrolyte at elevated temperatures, and supplying the supplementary electrolyte from the dissolved containers to the fuel cell while the cell is working.

23 Claims, 6 Drawing Sheets

FUEL CELL AND SUPPLEMENTARY ELECTROLYTE CONTAINER AND METHOD FOR SUPPLEMENTING FUEL CELL WITH ELECTROLYTE

BACKGROUND OF THE INVENTION

1. Field of the Invention

The present invention relates to a molten carbonate type or phosphate type fuel cell (referred to briefly as a "fuel cell" hereunder), a supplementary electrolyte container, and a method for supplementing the fuel cell with an electrolyte to compensate for a decrease of the electrolyte in the fuel cell during its operation.

2. Description of Related Art

When fuel cells have to be continuously operated, they are desired to be capable of operating for forty thousand hours. However, the electrolyte contained in an electrolyte member of a fuel cell gradually decreases over time due to evaporation and the corrosion of cell parts with the electrolyte. This results in an increase in internal resistance with the cell voltage being lowered. For this reason, when the cell is being operated for a long period of time, the electrolyte member must be periodically supplemented with fresh electrolyte. This supplementing is conventionally accomplished by supplying from an electrolyte storage external to the cell. In this method, however, a facility with piping necessary for the supplement must be installed externally of the fuel cell, and in addition the piping and other equipment must be made of materials resistant to corrosion by the electrolyte, which are problematic in durability and cost. A solution to these problems is described in Japanese Patent KOKAI (Laid-open) No. 60-208058. This solution employs a method consisting of filling an electrolyte-retaining matrix in a part of a gas flow path which is provided facing to an electrode on its side remote from an electrolyte-impregnated member which is sandwiched between the electrode and the other one, and allowing the electrolyte to constantly supply from the matrix to the electrolyte member owing to the capillary phenomenon. Japanese Patent KOKAI (Laid-open) No. 58-155668 discloses a method consisting of providing channels for storing an electrolyte at peripheral portions of a separator, storing an electrolyte in the channels, and supplying the electrolyte during the working time of the cell.

The electrolyte impregnated in the electrolyte member of the fuel cell is in a molten state and strongly corrosive at the cell working temperature. With respect to this point, the known methods as described above fail to take into consideration the corrosion of the electrolyte storage. That is, the stored supplementary electrolyte is in the molten state at the Working temperature of the fuel cell so that the materials constituting the electrolyte storage are gradually corroded as the cell works. The use of corrosion-resistant equipment may be considered to prevent the electrolyte storage from corrosion, but would be undesirable in view of cost. As above, the known methods fail to take into consideration the corrosion of the electrolyte storage, and cause problems as to the life and reliability of the cells.

SUMMARY OF THE INVENTION

An object of the present invention is to provide a fuel cell having a high reliability and a longer life.

Another object of the present invention is to provide a method for supplying a supplementary electrolyte to the fuel cell.

Still another object of the present invention is to provide a supplementary electrolyte container for aiding the supplement of the fuel cell with the electrolyte.

Still another object of the present invention is to provide a fuel cell comprising an electrolyte member impregnated with an electrolyte, a pair of electrodes sandwiching the electrolyte member, and separators, each being disposed facing to one of the electrodes on the side thereof remote from the electrolyte member and having channels formed thereon, through which reaction gases pass to respective electrodes, wherein soluble containers filled with the electrolyte are loaded inside the fuel cell.

Still another object of the present invention is to provide a method for supplementing the fuel cell with an electrolyte, comprising loading soluble containers filled with electrolyte within the fuel cell, and allowing the containers to dissolve, thereby supplying the electrolyte included in the containers to the fuel cell.

Still another object of the present invention is to provide a sealed soluble container containing an electrolyte for the fuel cell, which container can be loaded inside the fuel cell.

DETAILED DESCRIPTION OF THE PREFERRED EMBODIMENTS

The sealed soluble containers filled with an electrolyte which are loaded inside a fuel cell are dissolved from the inner wall thereof with the electrolyte therein which is molten at the working temperature of the cell. The dissolution of the containers allows the molten electrolyte to be supplied through the perforations of perforated corrugate plates into the electrolyte members, so that the supplementary electrolyte is promptly supplied to the electrolyte members with less corrosion caused in the cell equipment. That is, in the prior art method for feeding a supplementary electrolyte, the electrolyte is always in contact with the cell equipment and always filling the electrodes so that the electrolyte is less absorbed in the electrodes, while in the present invention, the supplementary electrolyte is supplied as the electrolyte impregnated in the electrolyte member becomes deficient, so that the supplied electrolyte is promptly absorbed by the electrodes. Therefore, the frequency and the time duration of the contact between the cell equipment and the electrolyte are reduced, thereby causing less corrosion of the cell equipment.

affect the cell performance when the containers 6 dissolve; that is, the cell voltage under constant working conditions at a constant loading varies neither before nor after the dissolution at all.

TABLE 1

| Chemical composition, of materials for supplementary electrolyte containers | | | | | | | | | |
|---|---|---|---|---|---|---|---|---|---|
| | C | Si | Mn | Ni | Cr | Mo | Al | Ti | Y | Fe |
| 1 | 0.026 | 0.66 | 0.47 | 20.51 | 26.15 | — | — | — | — | bal. |
| 2 | 0.021 | 0.70 | 0.29 | 25.50 | 25.16 | — | — | — | — | bal. |
| 3 | 0.040 | 0.70 | 0.56 | 30.22 | 24.76 | — | — | — | — | bal. |
| 4 | 0.037 | 0.68 | 0.62 | 35.82 | 24.89 | — | — | — | — | bal. |
| 5 | 0.044 | 0.70 | 0.61 | 40.03 | 24.43 | — | — | — | — | bal. |
| 6 | 0.049 | 0.69 | 0.70 | 30.45 | 24.69 | — | 0.53 | — | — | bal. |
| 7 | 0.050 | 0.67 | 0.66 | 30.36 | 24.53 | — | 1.08 | — | — | bal. |
| 8 | 0.043 | 0.68 | 0.58 | 30.14 | 24.93 | — | — | 0.32 | — | bal. |
| 9 | 0.046 | 0.71 | 0.53 | 30.45 | 24.43 | — | — | 0.64 | — | bal. |
| 10 | 0.032 | 0.75 | 0.56 | 30.31 | 24.89 | 0.70 | — | — | — | bal. |
| 11 | 0.040 | 0.63 | 0.63 | 30.35 | 24.93 | 3.25 | — | — | — | bal. |
| 12 | 0.041 | 0.09 | 0.60 | 30.56 | 24.76 | — | — | — | — | bal. |
| 13 | 0.048 | 0.70 | 0.59 | 30.16 | 24.73 | — | 0.41 | — | 0.05* | bal. |
| 14 | 0.015 | 0.64 | 1.37 | 12.07 | 17.34 | 2.02 | — | — | — | bal. |
| 15 | 0.05 | 0.75 | 0.99 | 19.38 | 25.28 | — | — | — | — | bal. |

*The amount added.

The present invention is further described with reference to Examples and the accompanying drawings.

Figure 1:
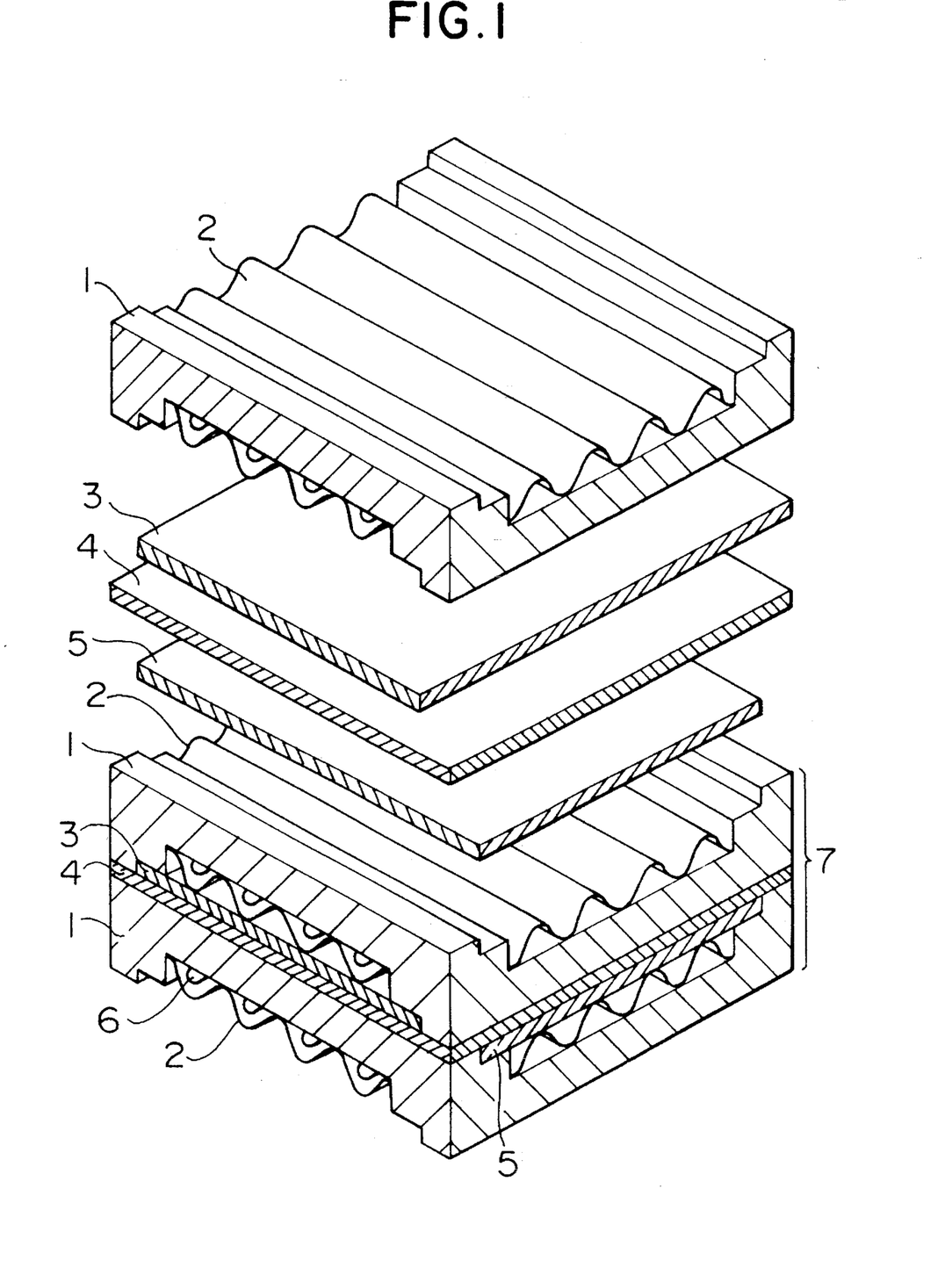
FIG. 1 shows an exploded arrangement of components of an embodiment of the fuel cell according to the present invention.

FIG. 1 is an exploded arrangement of the components of an embodiment of the fuel cell according to the present invention. In the Figure, an electrolyte member 4 impregnated with an electrolyte is sandwiched between a pair of electrodes, an anode 3 and a cathode 5. Separators 1 are disposed each facing to one of the electrodes, the anode 3 or the cathode 5, on the side thereof remote from the electrolyte member, and have perforated corrugate plates 2 which constitute channels through which reaction gases pass to respective electrodes. These components constitute together one generator cell 7. A plurality of such generator cells 7 may be stacked to form a fuel cell assembly.

Figure 2:
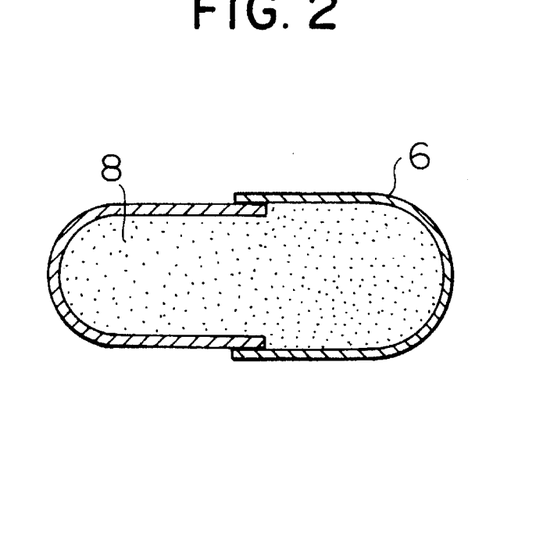
FIG. 2 is a schematic cross-sectional view of a sealed container including supplementary electrolyte.
Figure 3:
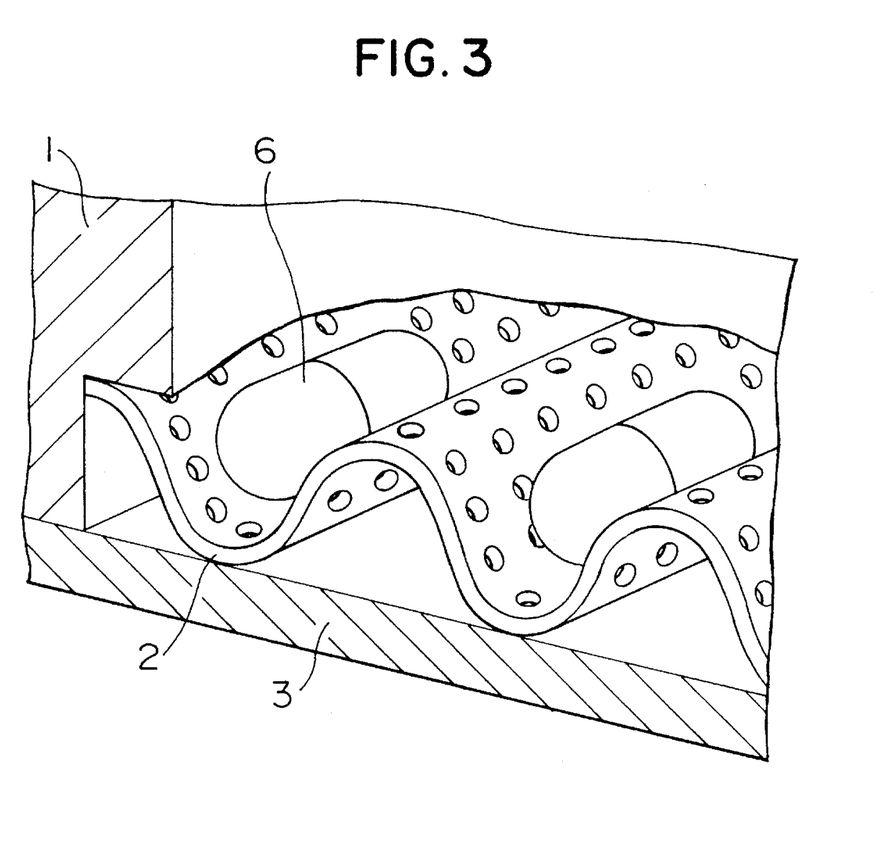
FIG. 3 is a schematic view of sealed containers for feeding a supplementary electrolyte showing one of the ways how the containers may be disposed in a fuel cell.

In the fuel cell arranged as described above, a plurality of sealed soluble containers 6 filled with an electrolyte 8 to be used for effecting supplement with the electrolyte as shown in FIG. 2 are placed particularly in recessed sections, through which no reaction gas passes, of the perforated corrugate plates 2 forming gas flow channels, as can be seen from the partly enlarged schematic perspective view as shown in FIG. 3. In FIG. 3, reference numeral 1 designates the separator, reference numeral 2 the perforated corrugate plate, reference numeral 3 the anode, and reference numeral 6 the sealed supplementary electrolyte container. The electrolyte 8 may be one that is used generally in the molten carbonate type fuel cells, for example, a mixed salt (density: 1.934 g/cm³) of lithium carbonate ($Li_2CO_3$) and potassium carbonate ($K_2CO_3$) in a ratio of $Li_2CO_3$:$K_2CO_3$=62:38. Materials to be used for the supplementary electrolyte containers 6 include stainless steels such as JIS-SUS316, JIS-SUS310, and high Cr austenite stainless steel 25Cr-20Ni which may be chemically modified by changing the amount of Ni or adding Al, Ti, Mo, and Y. Exemplary chemical compositions of these materials are listed in Table 1 below. The materials to be used for the sealed supplementary electrolyte containers 6 of the present invention should not Next, the functions of the thus constituted fuel cell are described. First, the sealed soluble containers 6 formed with the aforementioned materials to be used for supplementing with electrolyte are filled with an electrolyte, and a plurality of the filled containers 6 are incorporated within the fuel cell in the vicinity of the aforementioned electrolyte member 4 in the course of assembling the cell. When the cell is completed, the temperature of the cell is increased to the cell working temperature of 650° C. and then the cell starts working. The electrolyte, which has a melting temperature of 491° C., is in the molten state at the working temperature of 650° C. and has a strong alkaline property. Therefore, the electrolyte 8 inside the sealed soluble containers 6 for supplying supplementary electrolyte is also molten at the cell working temperature of 650° C. and has a strong alkaline property. For this reason, the sealed supplementary electrolyte soluble containers 6 formed with the aforementioned SUS316, SUS310 and 25Cr-20Ni stainless steel begin to dissolve from their inner walls and release the molten electrolyte, which has filled the containers, when the full thickness of at least a portion of the container walls is dissolved, and the released electrolyte passes through the perforated corrugate plates 2 and the anode 3 into the electrolyte member 4 as supplementary electrolyte. That is, the sealed supplementary electrolyte soluble containers 6 are dissolved approximately at the time when the electrolyte contained in the electrolyte member becomes deficient, and the supplementary electrolyte is fed into the electrolyte member. The thickness of the walls of the sealed supplementary electrolyte containers 6 may be selected by taking into consideration the type and the amount of the electrolyte to be included in the containers, and the time required to dissolve the containers with the electrolyte.

The supplementary electrolyte can be supplied into the electrolyte member 4 in the manner as described above. However, even after the supplement with the electrolyte is made, the operation of the cell may again cause a deficiency of electrolyte. Therefore, rather than a plurality of the sealed supplementary electrolyte soluble containers 6 being dissolved all at once, the supply of electrolyte to the electrolyte member 4 should be effected in several stages by employing a plurality of types of container which are made of varying materials, or which have a varying wall thickness. It is a matter of course that such constitution allows the further extended operation of the fuel cell.

Figure 4:
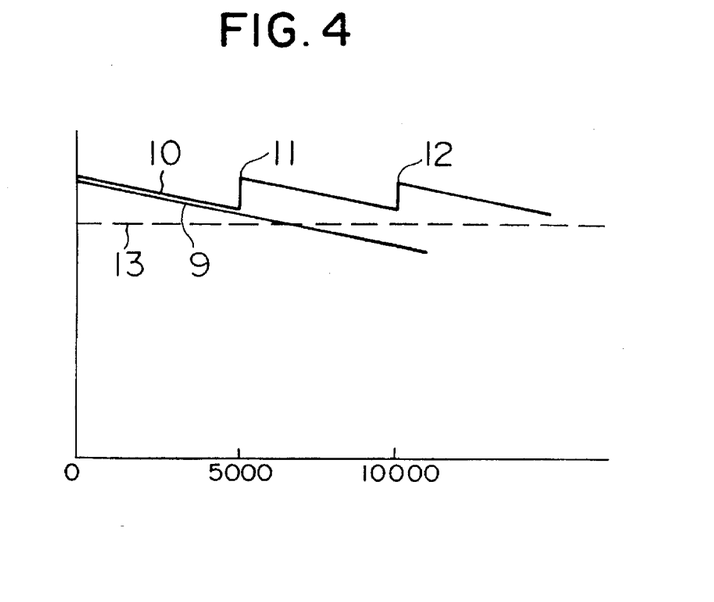
FIG. 4 is a graph showing the timing of feeding a supplementary electrolyte.

FIG. 4 is a graph showing the profile of one of the supplements as described above, with the cell voltage being plotted on the ordinate and the cell working time on the abscissa. In the Figure, line 9 represents the case where no supplement was conducted, and in this case it is apparent that the voltage decreases with time. On the other hand, line 10 represents one of the examples of the present invention, and in this case one can see that the voltage decreases initially with time similarly to the case of the line 9. When the cell working time reached 5000 hours, that is, just before reaching the broken line 13 indicating a measure of a need for electrolyte supplement, the first supplement with electrolyte was carried out as described above. This restored the reduced cell voltage to the level of the initially generated voltage in the cell operation, as indicated at the point 11. The broken line 13 was previously determined from a test operation of the cell, and lies on a level lower than the initially generated voltage in the cell operation by one percent.

Although the first supplement restored the cell voltage to the level of the initial voltage, subsequently the voltage again decreased as the cell was operated. When the cell working time reached an additionally 5000 hours or so, (that is, just before the voltage reached the broken line 13), a second supplement with the electrolyte was conducted to restore the cell voltage (point 12).

For convenience, the above description has shown the electrolyte supplements at every 5000 hours, but practically a continuous working time of 40,000 hours has been desired for fuel cells, which governs the rate of depression in cell voltage relative to the cell working time and the frequency of the electrolyte supplement.

Alternatively, the electrolyte supplement may be conducted by modifying the structure of the sealed supplementary electrolyte soluble containers 6 or the location thereof in the cell depending upon partial variation of a reduction in the amount of electrolyte. That is, in the electrolyte member 4, there may be produced portions where the impregnated electrolyte decreases to a larger extent or to a lesser extent depending upon the gas flow rate or the reaction and the like. For this reason, if the sealed supplementary electrolyte soluble containers 6 are uniformly distributed and the supplement with the electrolyte is conducted in the same timing at the locations opposite to the portions where the electrolyte decreases to a larger extent as where the electrolyte does to a lesser extent, an excess of electrolyte over the amount of electrolyte impregnated into the electrolyte member 4 intrudes into the electrodes resulting in clogging of the sites and a consequent significant reduction in cell performance.

In order to overcome these difficulties, for example, the following expedients may be considered:
1) A greater number of the sealed supplementary electrolyte containers 6 are disposed at the locations opposite to the portions of the electrolyte member where a greater reduction of the electrolyte occurs, while a lesser number of the containers are disposed at those where a lesser reduction occurs.
2) Sealed supplementary electrolyte containers 6 having a thinner wall are disposed at the locations opposite to the portions of the electrolyte member where a greater reduction of the electrolyte occurs, while the containers 6 having a thicker wall are disposed at those where a lesser reduction occurs.
3) Sealed supplementary electrolyte containers 6 formed with materials prone to dissolving with the electrolyte are disposed at the locations opposite to the portions of the electrolyte member where a greater reduction of the electrolyte occurs, while the containers 6 formed with materials less prone to dissolving with the electrolyte are disposed at those where a lesser reduction occurs.

Examples employing these expedients are described below.

A stack of cells having an output of about 100 kW was manufactured for study. A separator had dimensions of 1500 mm×1500 mm, and 88 cells each having a thickness of 7 mm were stacked. The cells had an electrode area of 12100 cm$^2$. The amount of electrolyte to be supplied to such a cell was 100 g every time. As the target working time was 40,000 hours, 8 stages of supplementation were required, with the supplement being made every 5,000 hours on average.

Figure 5:
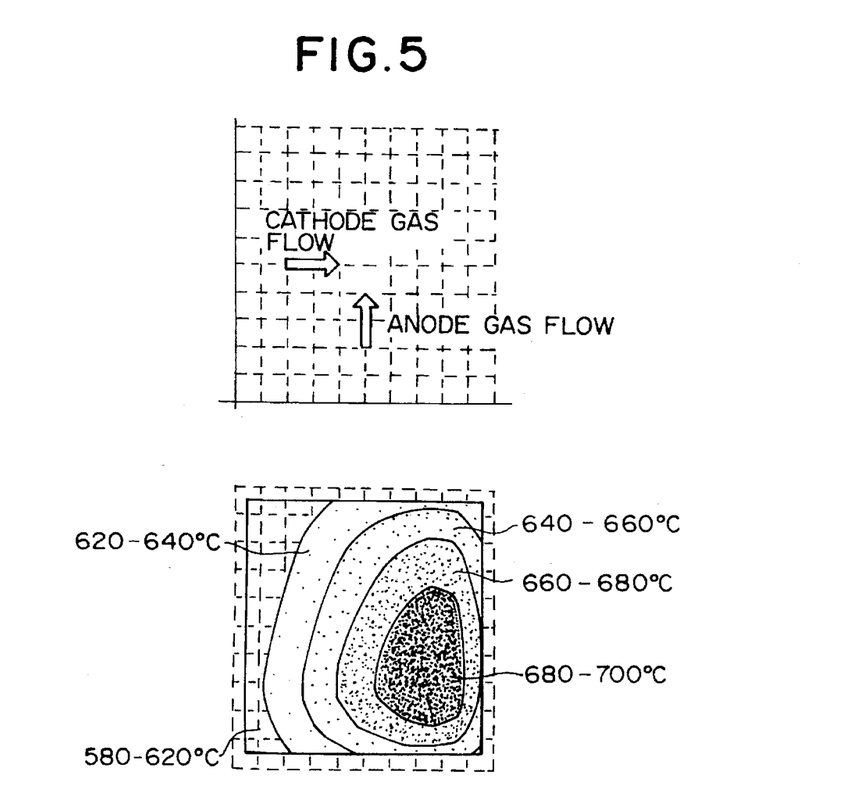
FIG. 5 is a topography showing an in-plane temperature distribution of an electrolyte sheet.

Deficiency of electrolyte occurs at varying times in varying portions of the electrolyte member, because the in-plane temperature distribution of the cell is as shown in FIG. 5. For this reason, the portions having a relatively low temperature require a longer time interval between the supplements with the number of the supplements being smaller. Conversely the higher temperature portions require a larger number of the supplements.

Taking account of these circumstances, three types of sealed supplementary electrolyte containers were prepared corresponding to the temperatures of the loading places. The outside dimensions of the containers were 1.50 mm in diameter, 3.42 mm in length and in the range of 0.06 to 0.10 mm in thickness depending upon the loading places. One container supplied its supplementary electrolyte to one centimeter square of the electrolyte member. In addition three types of material were provided corresponding to the temperatures of the loading places, i.e., SUS316 of 0.10 mm in thickness for the temperatures of 580° to 620° C., 25Cr-20Ni of 0.06 mm in thickness for 620° to 660° C., 25Cr-20Ni of 0.10 mm in thickness for 660° to 700° C. The chemical compositions of the SUS316 and the 25Cr-20Ni were of Nos. 14 and 1 in the Table 1, respectively.

As described above, the number of the supplementary electrolyte containers to be loaded was varied according to the temperature distribution as shown in FIG. 5. That is, 6 containers were disposed at locations in the temperature range of 580° to 620° C., 7 to 8 containers at 620° to 660° C. and 9 containers at 660° to 700° C. The containers were disposed in the channels of the perforated corrugate plate of a separator immediately on the top of the anode (see the partly enlarged perspective view shown in FIG. 3). The containers were disposed scatteredly in some channels with some containers being in a row along a channel corresponding to the predetermined temperature ranges, taking account of the temperature profile which is not parallel to the channels.

As described above, according to this Example, the sealed soluble containers filled with an electrolyte are loaded inside a cell and the containers are dissolved to supply the electrolyte, which has been contained therein, to the electrolyte member, so that the electrolyte members are promptly supplemented with the electrolyte, thereby causing less corrosion in the cell equipment. In the prior art method for feeding a supplementary electrolyte, the electrolyte is always in contact with the cell equipment and always filling the electrodes so that the supplementary electrolyte is not easily to be absorbed in the electrodes, while in the present invention, the supplementary electrolyte is supplied as the electrolyte impregnated in the electrolyte member becomes deficient, so that the supplied electrolyte can easily be absorbed by the electrodes. As a result, prompt supplement with electrolyte is achieved, thereby allowing the cell equipment to have a longer life and the cell reliability to be enhanced.

Moreover, the use of sealed supplementary electrolyte soluble containers of varying materials and/or varying thicknesses permits optional selections of the total operation time with the electrolyte supplements, the number of the electrolyte supplements, and the amount of electrolyte to be supplemented at one time. Therefore, while maintaining ordinary working conditions, an optional amount of supplementary electrolyte can be fed at an optional time interval, enabling the cells to operate over a prolonged period of time. Moreover, the disposition of the sealed supplementary electrolyte soluble containers in compliance with the portions of the electrolyte member where the electrolyte decreases partially to a greater extent or a lesser extent due to the reactions with gases and the like, allows the electrolyte member to be uniformly impregnated with a constant amount of electrolyte so that the cell performance is not affected significantly.

The Examples of the present invention have been described with reference to FIGS. 1 to 5. Next other Examples will be described with reference to FIGS. 6 and 7.

Figure 6:
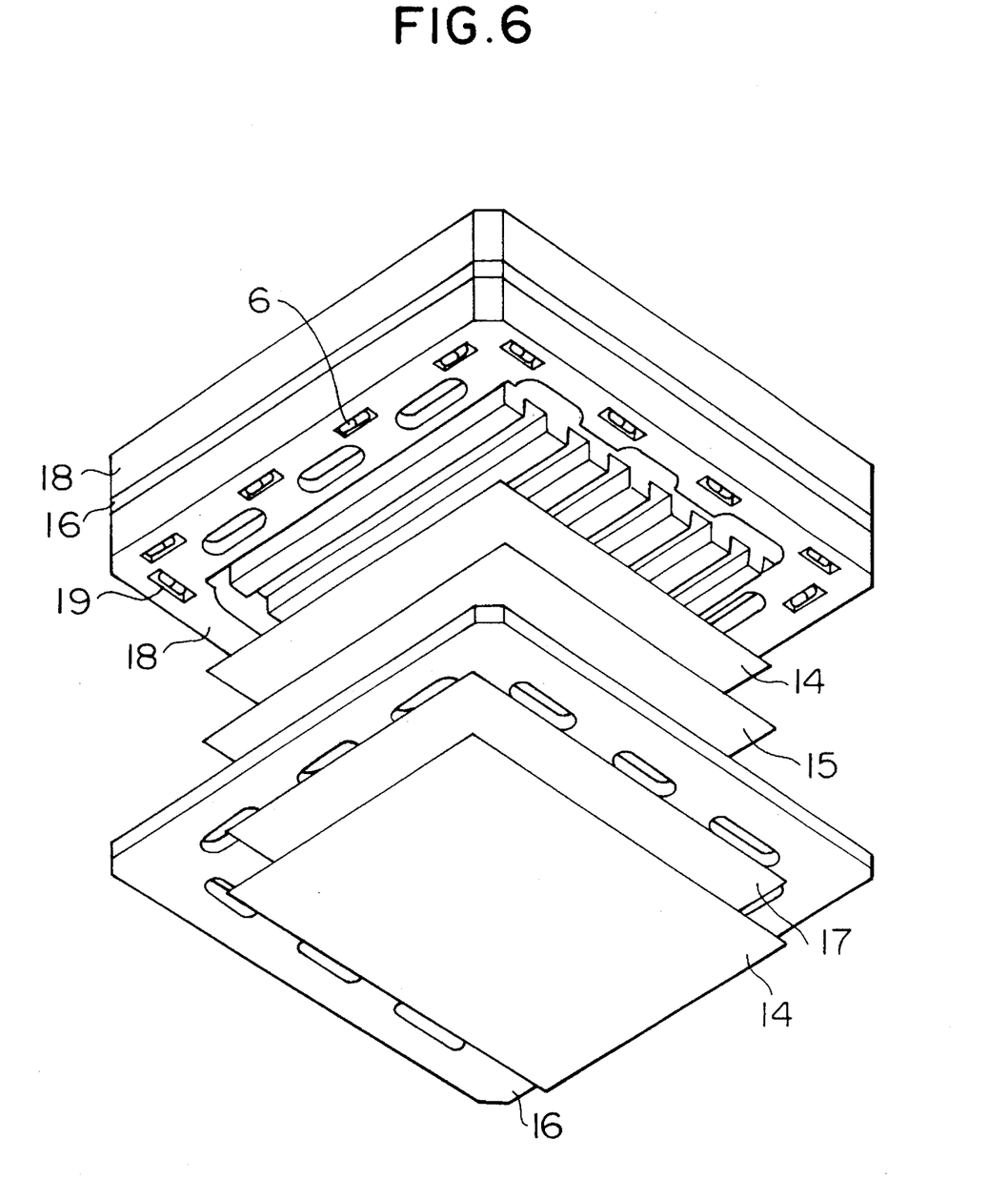
FIG. 6 is an exploded arrangement of components of an embodiment of the fuel cell according to the present invention.

The fuel cell studied was of a small size having an electrode surface area of 55 cm×55 cm and had a separator 18 equipped with a manifold for supplying reaction gases to each electrode. The fuel cell comprised an electrolyte member 16 impregnated with an electrolyte having the manifold in its peripheral portion, an anode 15 and a cathode 17 which sandwich the electrolyte member 16, collector 14 and the separator 18 equipped with the manifold for passing reaction gases to each electrode.

As shown in FIG. 6, the separator 18 has holes 19 formed in its peripheral portion for receiving sealed supplementary electrolyte containers 6 to store the electrolyte. In the prior art, these holes 19 directly contain the electrolyte to be stored, which is supplied at all times to the electrolyte member so that the materials around the holes are gradually dissolved with the stored electrolyte which is molten at the cell working temperature.

Figure 7:
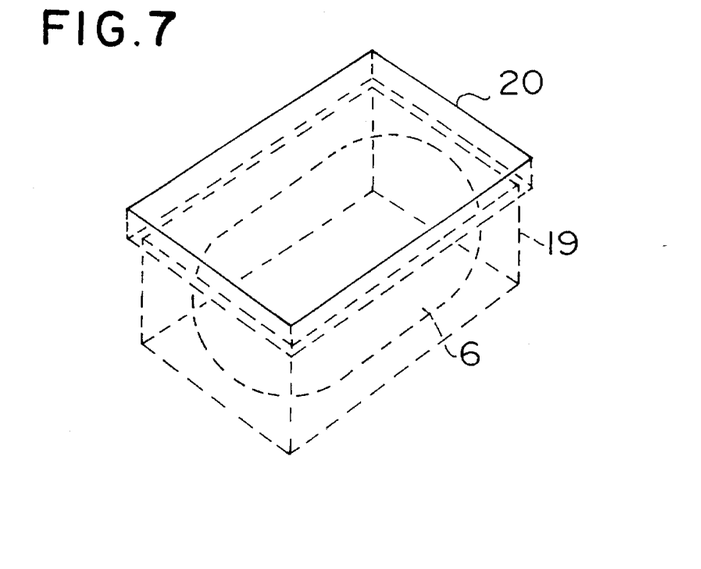
FIG. 7 is a schematic view of sealed containers for feeding a supplementary electrolyte showing one of the ways how the containers may be disposed in the fuel cell shown in FIG. 6.

In order to overcome this difficulty, as shown in FIG. 7, the present invention employs filling the electrolyte in the sealed supplementary electrolyte soluble containers 6 as described in the previous Example, and covering each of the containers with a sheet 20 which is designed to cover the hole 19, and which is made of the same material as that of the sealed supplementary electrolyte soluble containers 6 or a material susceptible to dissolution with the stored electrolyte. The material for the sealed supplementary electrolyte containers 6 and the sheet 20 referred to here can be handled in the same manner as the sealed supplementary electrolyte soluble containers 6 described in the previous Example.

A method for loading the sealed supplementary electrolyte containers 6 is as follows: The separator 18 is placed with the holes 19 being upwardly open, and the containers 6 are placed in the holes 19. Then each of the holes are covered and adhered with the sheet 20. The container-loaded separator is reversed so that the sheet is face down and placed on the anode in the course of assembling a cell. In this way, the separator is disposed with the sealed openings of the holes containing the container being always directed downwardly. This arrangement allows the molten supplementary electrolyte to flow down by gravity from the dissolved containers to the electrolyte member.

When the fuel cell is operating, the sealed supplementary electrolyte soluble containers 6 placed in the holes 19 are dissolved from the inner wall with the electrolyte filled therein, and the electrolyte flows out into the holes 19. Then the sheets 20 are dissolved by the electrolyte received in the holes 19, and the electrolyte in the holes 19 is in turn supplied to the electrolyte member 15. The presence of the sheets 20 can retard the commencement of the supplement with the electrolyte, as compared with the case where only the containers 6 are used.

As described above, in this Example, the sealed soluble containers 6 filled with the supplementary electrolyte are placed in the holes 19 formed in the separator 18 and covered with a sheet 20 made of the same material as that of the sealed supplementary electrolyte soluble containers 6 or a material susceptible to dissolution with the stored electrolyte. The sealed supplementary electrolyte soluble containers and the sheets covering the holes 19 are dissolved with the molten electrolyte at the cell working temperature to feed the supplementary electrolyte to the electrolyte member. In this way the same effects as those noted in the previous Example can be achieved, and even the conventional fuel cells can be supplied with supplementary electrolyte by using the aforementioned containers.

The use of the sheets allows the initiation time of the supplement with electrolyte to be controlled as described in the above Example, and the combination thereof with the arrangement of the previous Example enables the cell working time with the electrolyte supplements to extend in excess of 40,000 hours.

Although the present invention has been described with reference to two Examples of a molten carbonate type fuel cell, it is applicable to phosphoric acid type fuel cells as well.

Figure 8:
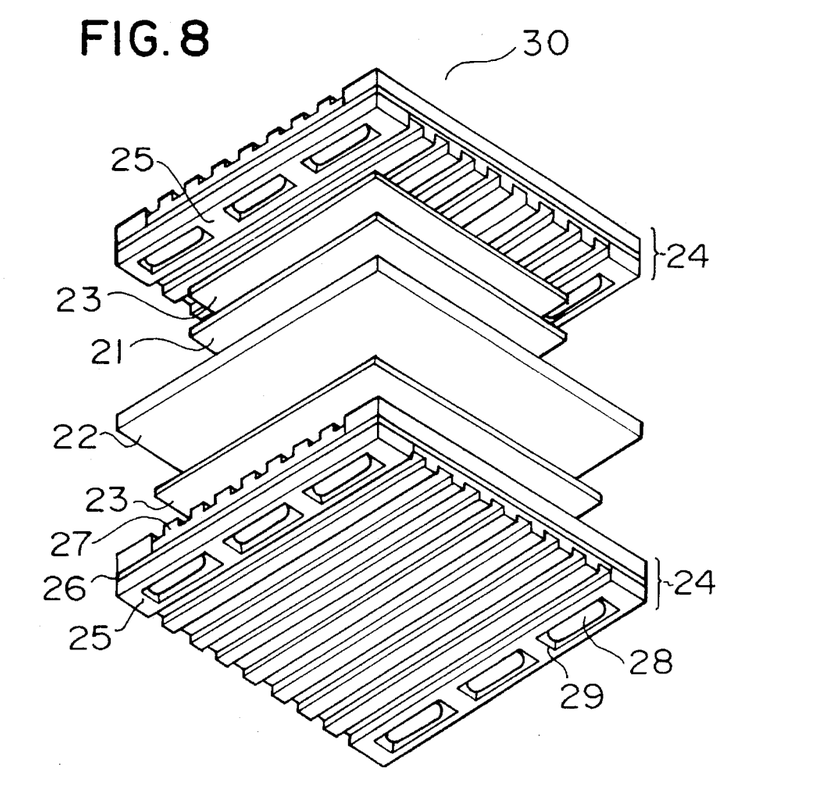
FIG. 8 is an exploded arrangement of components of another embodiment of the fuel cell according to the present invention.

FIG. 8 shows an arrangement of one of the phosphoric acid type fuel cells. In the Figure, reference numeral 21 designates an electrolyte member impregnated with a phosphoric acid electrolyte, under which a spacer 22 is disposed. Catalysts 23 are disposed on the upper side and the lower side of a combination of the member and the spacer. The whole is further sandwiched from the upper and the lower side with separators 24 to form a generator cell 30. The separator 24 is composed of edge seals 25, a carbon plate 26 and reservoirs 27. A plurality of the generator cells 30 are stacked to form a fuel cell.

Figure 9:
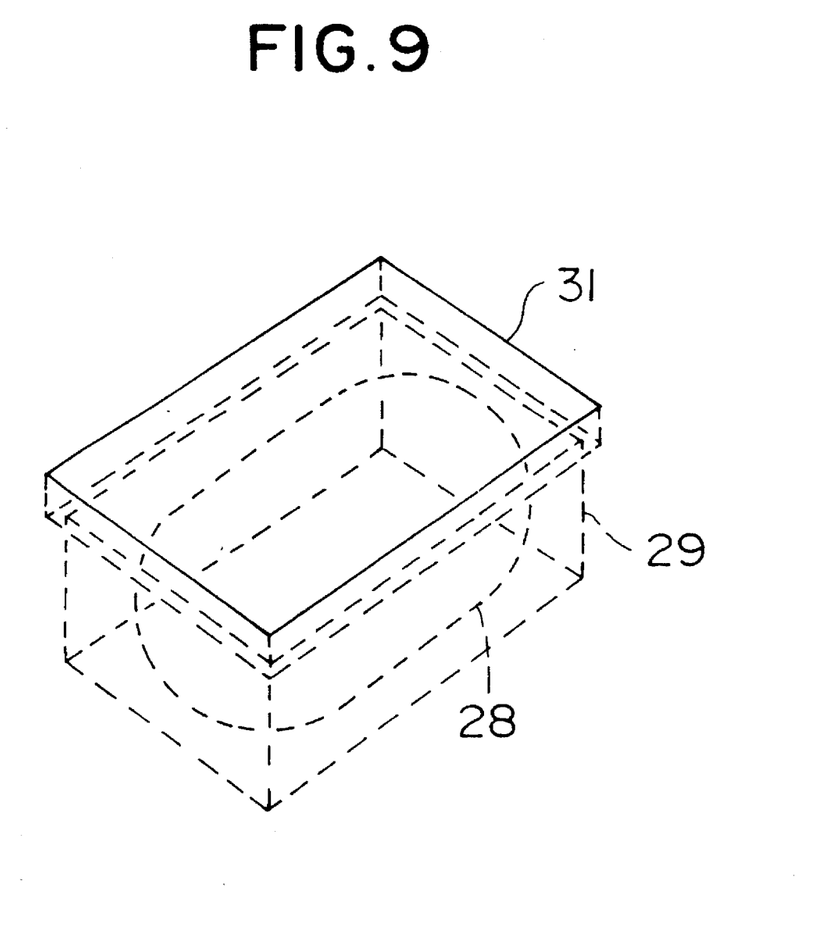
FIG. 9 is a schematic view of sealed containers for feeding a supplementary electrolyte showing one of the ways how the containers may be disposed in the fuel cell shown in FIG. 8.

As shown in FIG. 8, the edge seals 25 have holes 29 formed in their peripheral portions for receiving the sealed supplementary electrolyte containers 28. In this Example, the sealed containers 28 are solube in the phosphoric acid electrolyte, and are thus filled with the phosphoric acid electrolyte to achieve the same effects as to those as described in the Examples of the molten carbonate type fuel cells. Moreover, the containers placed in the holes 29 are covered with a sheet 31 which is designed to cover the hole, and which is made of the same material as that of the sealed supplementary electrolyte soluble containers 28 or a material susceptible to dissolution with the stored electrolyte as shown in FIG. 9.

According to the present invention, the sealed soluble containers filled with an electrolyte are loaded inside a cell and the containers are dissolved to provide the electrolyte which has been filled therein as a supplement to the electrolyte member. Thus the present invention can provide a fuel cell having a high performance, a method for feeding a supplementary electrolyte, and a supplementary electrolyte container for achieving the same.

What is claimed is:

1. A fuel cell comprising an electrolyte member impregnated with an electrolyte, a pair of electrodes sandwiching the electrolyte member, and separators, each being disposed facing to one of the electrodes on the side thereof remote from the electrolyte member and having channels formed, through which a reaction gas passes to the adjacent electrode, wherein a plurality of sealed supplementary electrolyte containers made of a material soluble in the electrolyte at elevated temperatures and filled with the electrolyte are disposed scatteredly inside the fuel cell.

2. The fuel cell according to claim 1, wherein said fuel cell contains molten carbonate or phosphoric acid as the electrolyte.

3. The fuel cell according to claim 1, wherein said material of said container soluble in the electrolyte has a different solubility depending upon the location at which said container is disposed within said fuel cell.

4. The fuel cell according to claim 1, wherein said material soluble in the electrolyte is stainless steel.

5. The fuel cell according to claim 4, wherein said stainless steel is at least one of SUS316, SUS310, and high Cr austenite stainless steel.

6. The fuel cell according to claim 5, wherein said high Cr austenite stainless steel is 25Cr-mNi stainless steel, where m is 19.3 to 40.5% by weight, to which at least one of Al, Ti, Mo and Y is added.

7. The fuel cell according to claim 1, wherein perforated corrugate plates for providing gas flow paths are disposed on both major surfaces of at least one of said separators, and said sealed supplementary electrolyte containers are disposed scatteredly in separator channels where no reaction gas passes.

8. The fuel cell according to claim 1, wherein a plurality of holes are provided in the peripheral portion of at least one of said separators, and said sealed supplementary electrolyte containers are disposed in at least some of the holes.

9. The fuel cell according to claim 8, wherein said holes are covered each with a sheet.

10. A sealed supplementary electrolyte container to be disposed within a fuel cell which comprises an electrolyte member impregnated with an electrolyte, a pair of electrodes sandwiching the electrolyte member, and separators, each being disposed facing to one of the electrodes on the side thereof remote from the electrolyte member and having channels formed thereon, through which a reaction gas passes to the adjacent electrode, said container being made of a material soluble in the electrolyte at elevated temperatures and filled with the electrolyte.

11. The container according to claim 10, wherein said fuel cell contains molten carbonate or phosphoric acid as the electrolyte.

12. The container according to claim 10, wherein said material of said container soluble in the electrolyte has a different solubility depending upon the location at which said container is disposed within said fuel cell.

13. The container according to claim 10, wherein said material soluble in the electrolyte is stainless steel.

14. The container according to claim 13, wherein said stainless steel is at least one of SUS316, SUS310, and high Cr austenite stainless steel.

15. A method for supplementing a fuel cell with an electrolyte, said fuel cell comprising an electrolyte member impregnated with the electrolyte, a pair of electrodes sandwiching the electrolyte member, and separators, each being disposed facing to one of the electrodes on the side thereof remote from the electrolyte member and having channels formed thereon, through which a reaction gas passes to the adjacent electrode, wherein said method comprises disposing at least one of sealed supplementary electrolyte containers made of a material soluble in the electrolyte at elevated temperatures and filled with the electrolyte within said fuel cell, and supplying the supplementary electrolyte from the dissolved containers to said fuel cell during cell working.

16. The method for supplementing a fuel cell with an electrolyte according to claim 15, wherein said fuel cell contains molten carbonate or phosphoric acid as the electrolyte.

17. The method for supplementing a fuel cell with an electrolyte according to claim 15, wherein said material of said container soluble in the electrolyte has a different solubility depending upon the location at which said container is disposed within said fuel cell.

18. The method for supplementing a fuel cell with an electrolyte according to claim 15, wherein said material soluble in the electrolyte is stainless steel.

19. The method for supplementing a fuel cell with an electrolyte according to claim 18, wherein said stainless steel is at least one of SUS316, SUS310, and high Cr austenite stainless steel.

20. The method for supplementing a fuel cell with an electrolyte according to claim 19, wherein said high Cr austenite stainless steel is 25Cr-mNi stainless steel, where m is 19.3 to 40.5% by weight, to which at least one of Al, Ti, Mo and Y is added.

21. The method for supplementing a fuel cell with an electrolyte according to claim 15, wherein perforated corrugate plates for providing gas flow paths are disposed on both major surfaces of at least one of said separators, and said sealed supplementary electrolyte containers are disposed scatteredly in separator channels where no reaction gas passes.

22. The method for supplementing a fuel cell with an electrolyte according to claim 15, wherein a plurality of holes are provided in the peripheral portion of at least one of said separators and said sealed supplementary electrolyte containers are disposed in at least some of the holes.

23. The method for supplementing a fuel cell with an electrolyte according to claim 22, wherein said holes are covered each with a sheet.

\* \* \* \* \*

UNITED STATES PATENT AND TRADEMARK OFFICE
CERTIFICATE OF CORRECTION

PATENT NO. : 5,563,003
DATED : October 8, 1996
INVENTOR(S) : H. SUZUKI et al

It is certified that error appears in the above-indentified patent and that said Letters Patent is hereby corrected as shown below:

On the title page item [30], Add Priority Date:

--JAPAN     05-058768     03/18/93--.

Signed and Sealed this

Fourth Day of March, 1997

Attest:

BRUCE LEHMAN

Attesting Officer           Commissioner of Patents and Trademarks